(12) United States Patent
Manolakos et al.

(10) Patent No.: US 10,644,737 B2
(45) Date of Patent: May 5, 2020

(54) ADAPTIVE CYCLIC-SHIFT BASED MULTIPLEXING

(71) Applicant: QUALCOMM Incorporated, San Diego, CA (US)

(72) Inventors: Alexandros Manolakos, San Diego, CA (US); June Namgoong, San Diego, CA (US); Yang Yang, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/488,881

(22) Filed: Apr. 17, 2017

(65) Prior Publication Data

US 2018/0097534 A1 Apr. 5, 2018

Related U.S. Application Data

(60) Provisional application No. 62/402,859, filed on Sep. 30, 2016.

(51) Int. Cl.
*H04B 1/10* (2006.01)
*H04L 1/00* (2006.01)
(Continued)

(52) U.S. Cl.
CPC ......... *H04B 1/1081* (2013.01); *H04B 7/0413* (2013.01); *H04B 7/0632* (2013.01);
(Continued)

(58) Field of Classification Search
USPC ....................................................... 375/267
See application file for complete search history.

(56) References Cited

U.S. PATENT DOCUMENTS

| | | | |
|---|---|---|---|
| 2008/0037680 A1* | 2/2008 | Sakata | H04B 7/0613 375/267 |
| 2015/0172021 A1* | 6/2015 | Noh | H04B 7/0613 370/329 |

(Continued)

FOREIGN PATENT DOCUMENTS

| WO | WO-2011/123805 A1 | 10/2011 |
|---|---|---|
| WO | WO-2014/046516 A1 | 3/2014 |

OTHER PUBLICATIONS

International Search Report and Written Opinion—PCT/US2017/048221, International Search Authority—European Patent Office, dated Oct. 30, 2017. 12 pages.

*Primary Examiner* — Wednel Cadeau
(74) *Attorney, Agent, or Firm* — Arent Fox LLP

(57) ABSTRACT

Aspects of the present disclosure provide techniques for using cyclic-shifts in code division multiplexing to shift transmitted signals (e.g., reference signals, control signals, and/or data) from different antenna ports of the transmitting device. Particularly, for multiple-input multiple-output (MIMO) systems that multiply the capacity of a radio link by using multiple transmit and receive antennas to exploit multipath propagation, aspects of the present disclosure minimize interference at the receiving device by separating the signals from different antenna ports based on the channel impulse response (or delay spread) of each antenna port of the channel. In some examples, the transmitting device may maximize resource utilization by interleaving the reference signals, control signals, and/or data from a plurality of antenna ports while maintaining adequate spacing between each signal.

30 Claims, 11 Drawing Sheets

(51) Int. Cl.
    *H04B 7/0413*     (2017.01)
    *H04B 7/06*     (2006.01)
    *H04B 7/08*     (2006.01)
    *H04L 5/00*     (2006.01)
    *H04L 25/02*     (2006.01)
    *H04L 27/26*     (2006.01)

(52) U.S. Cl.
    CPC ......... *H04B 7/0865* (2013.01); *H04L 1/0001* (2013.01); *H04L 5/0007* (2013.01); *H04L 5/0048* (2013.01); *H04L 25/0212* (2013.01); *H04L 25/0228* (2013.01); *H04L 27/2607* (2013.01); *H04L 5/001* (2013.01); *H04L 5/005* (2013.01); *H04L 5/0051* (2013.01)

(56) References Cited

U.S. PATENT DOCUMENTS

2015/0271814 A1*   9/2015   Park ..................... H04B 7/04
                                                      370/329
2017/0085303 A1*   3/2017   Chen ................. H04B 7/0417

\* cited by examiner

ADAPTIVE CYCLIC-SHIFT BASED MULTIPLEXING

CROSS-REFERENCE TO RELATED APPLICATION(S)

This application claims benefit of U.S. Provisional Application Ser. No. 62/402,859, entitled "ADAPTIVE CYCLIC-SHIFT BASED MULTIPLEXING" and filed Sep. 30, 2016, which is expressly incorporated by reference herein in its entirety.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond.

SUMMARY

Aspects of the present disclosure provide techniques for using cyclic-shifts in code division multiplexing to shift transmitted signals (e.g., reference signals, control signals, and/or data) from different ports of the transmitting device. Particularly, for multiple-input multiple-output (MIMO) systems that multiply the capacity of a radio link by using multiple transmit and receive antennas to exploit multipath propagation, aspects of the present disclosure minimize interference at the receiving device by separating the signals from different antenna ports based on the channel impulse response (or delay spread) of each antenna port of the channel. In some examples, the transmitting device may maximize resource utilization by interleaving the reference signals, control signals, and/or data from a plurality of antenna ports while maintaining adequate spacing between each signal.

In some examples, a method for wireless communications for a transmitting device (e.g., base station) is disclosed. In some examples, the method may include determining a first delay spread for a first antenna port of a channel and assigning a first set of pilot signals (e.g., demodulation reference signals (DMRS)) for the first antenna port to a first cyclic shift of a subframe based on the first delay spread. The method may further include assigning a second set of pilots (e.g., channel state information-reference signal (CSI-RS) or a cell-specific reference signal (CRS)) for a second antenna port to a second cyclic shift of the subframe. In some examples, the first set of pilot signals for the first antenna port and the second set of pilot signals for a second antenna port may be multiplexed on the same resources on an OFDM symbol using cyclic-shifts that would result in maximum separation of the channels of the two antenna ports for enhanced channel estimation performance. Thereafter, the method may determine remaining available cyclic shifts for an OFDM symbol of the subframe. If there are available cyclic shifts after assigning the first and second set of pilot signals, aspects of the present disclosure may multiplex data and/or control in the remaining cyclic shifts on the same OFDM symbol as to maximize the usage of the available resources. After assigning the various signals (e.g., reference signals, control signals, and/or data) from different ports to the various cyclic shifts, the method may further transmit the OFDM symbol of the subframe to the UE (e.g., receiving device).

In another example, an apparatus for wireless communications is disclosed. The apparatus may include a memory configured to store instructions and a processor communicatively coupled with the memory. The processor may be configured to execute the instructions to determine a first delay spread for a first antenna port of a channel and assigning a first set of pilot signals (e.g., DMRS) for the first antenna port to a first cyclic shift of a subframe based on the first delay spread. The processor may further be configured to execute the instructions to assign a second set of pilots (e.g., channel state information-reference signal (CSI-RS) or a cell-specific reference signal (CRS)) for a second antenna port to a second cyclic shift of the subframe. In some examples, the first set of pilot signals for the first antenna port and the second set of pilot signals for a second antenna port may be multiplexed on the same resources on an OFDM symbol using cyclic-shifts that would result in maximum separation of the channels of the two antenna ports for enhanced channel estimation performance. Thereafter, the processor may be configured to execute the instructions to determine remaining available cyclic shifts for an OFDM symbol of the subframe. If there are available cyclic shifts after assigning the first and second set of pilot signals, aspects of the present disclosure may multiplex data and/or control in the remaining cyclic shifts on the same OFDM symbol as to maximize the usage of the available resources. After assigning the various signals (e.g., reference signals, control signals, and/or data) from different ports to the various cyclic shifts, the processor may further include instructions to transmit the OFDM symbol of the subframe to the UE (e.g., receiving device).

In another example, a computer readable medium for wireless communications is disclosed. The computer readable medium may include code for determining a first delay spread for a first antenna port of a channel and assigning a first set of pilot signals (e.g., DMRS) for the first antenna port to a first cyclic shift of a subframe based on the first delay spread. The computer readable medium may further include code for assigning a second set of pilots (e.g., channel state information-reference signal (CSI-RS) or a cell-specific reference signal (CRS)) for a second antenna port to a second cyclic shift of the subframe. In some examples, the first set of pilot signals for the first antenna port and the second set of pilot signals for a second antenna port may be multiplexed on the same resources on an OFDM symbol using cyclic-shifts that would result in maximum separation of the channels of the two antenna ports for enhanced channel estimation performance. Thereafter, the computer readable medium may further include code for determining remaining available cyclic shifts for an OFDM symbol of the subframe. If there are available cyclic shifts after assigning the first and second set of pilot signals, aspects of the present disclosure may multiplex data and/or control in the remaining cyclic shifts on the same OFDM symbol as to maximize the usage of the available resources. After assigning the various signals (e.g., reference signals, control signals, and/or data) from different ports to the various cyclic shifts, the computer readable medium may further include code for transmitting the OFDM symbol of the subframe to the UE (e.g., receiving device).

In another example, another apparatus for wireless communications is disclosed. The apparatus may include means for determining a first delay spread for a first antenna port of a channel and assigning a first set of pilot signals (e.g., DMRS) for the first antenna port to a first cyclic shift of a subframe based on the first delay spread. The apparatus may further include means for assigning a second set of pilots (e.g., channel state information-reference signal (CSI-RS) or a cell-specific reference signal (CRS)) for a second antenna port to a second cyclic shift of the subframe. In some examples, the first set of pilot signals for the first antenna port and the second set of pilot signals for a second antenna port may be multiplexed on the same resources on an OFDM symbol using cyclic-shifts that would result in maximum separation of the channels of the two antenna ports for enhanced channel estimation performance. Thereafter, the apparatus may further include means for determining remaining available cyclic shifts for an OFDM symbol of the subframe. If there are available cyclic shifts after assigning the first and second set of pilot signals, aspects of the present disclosure may multiplex data and/or control in the remaining cyclic shifts on the same OFDM symbol as to maximize the usage of the available resources. After assigning the various signals (e.g., reference signals, control signals, and/or data) from different ports to the various cyclic shifts, the apparatus may further include means for transmitting the OFDM symbol of the subframe to the UE (e.g., receiving device).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
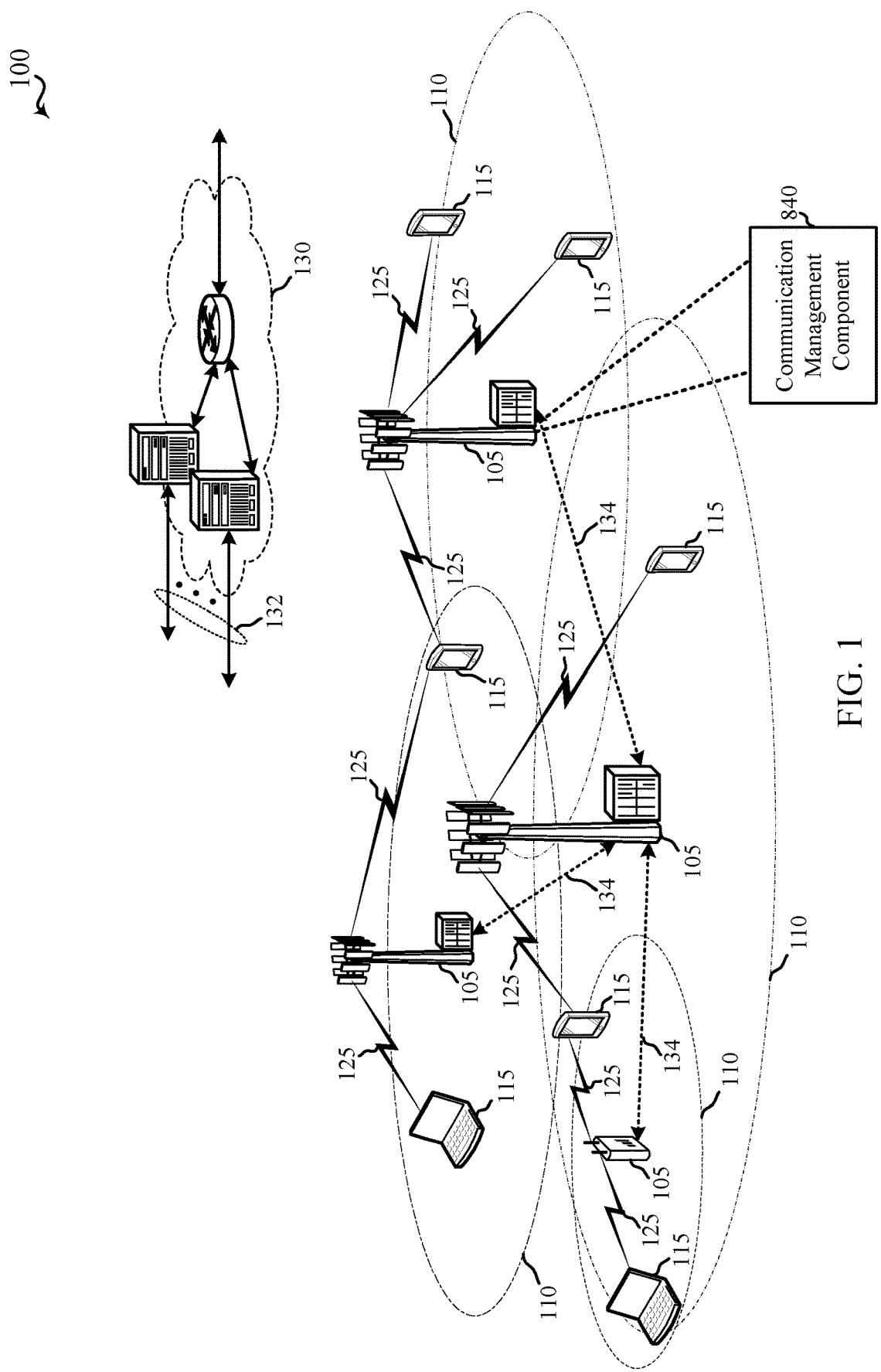
FIG. 1 illustrates an example of a wireless communications system in accordance with aspects of the present disclosure.

Some wireless communication systems allow for a transmitting device (e.g., base station) and the receiving device (e.g., user equipment (UE)) to communicate using multiple antennas. Such systems may be referred to as multiple-input and multiple-output (MIMO) systems that multiply the capacity of a radio link using multiple transmit and receive antennas to exploit multipath propagation. Successful data transmission and reception through multiple antennas, however, generally requires that the transmitting device have knowledge of the channel between transmitting antennas and receiving antennas. Channel information may be information about radio channels between a plurality of transmit antennas and a plurality of receiving antennas (e.g. attenuation, a phase shift, a time delay, etc.). Particularly, during a course of a transmission, channel conditions between the transmitting device and the receiving device may fluctuate. Accordingly, a receiving device and/or transmitting device may identify the channel information through the process of channel estimation. The term channel estimation may refer to the process of estimating channel conditions for recovering a distorted transmission signal. In some examples, the receiving device may feedback the channel estimation information to the transmitting device in order to allow the transmitting device to adjust its transmission parameters based on the observed distortions at the receiving device.

For channel estimation, a reference value may be estimated from one or more reference signals received from the transmitting device. In some examples, a reference signal may be one or more signals transmitted at a high power level without carrying actual data to help channel estimation at the receiver. In wireless communication systems, the reference signal allows the receiving device and the transmitting device to estimate channel conditions using properties of the reference signal known to both the transmitting device and the receiving device. In some aspects, a reference signal may also be referred to as a pilot signal. In MIMO systems, in order to estimate the channel conditions, separate reference signals may be needed for each of a plurality of transmit antenna.

Additionally, multiple-access technologies may utilize orthogonal frequency-division multiplexing (OFDM) to encode digital data on multiple carrier frequencies. In OFDM systems, typical methods to multiplex information (e.g., pilot signals, data, or control) include: time division multiplexing (TDM), frequency division multiplexing (FDM), and code division multiplexing (CDM). TDM is a technique for transmitting two or more signals over a radio link where each signal is sent as a series of pulses or packets, which are interleaved with those of the other signal(s) and transmitted as a continuous stream. FDM also transmits two or more signals over the radio link. However, in FDM, each signal is transmitted as a unique range of frequencies within the bandwidth of the channel, enabling several signals to be transmitted simultaneously. CDM is a technique in which multiple data signals are combined for simultaneous transmission over a common frequency band.

Because in MIMO systems, separate reference signals may be needed for each transmit antenna port in order to accurately estimate the channel conditions of each port, CDM may be employed to multiplex the reference signals from different ports for transmission on the same resources. In some aspects, transmitting multiple reference signals from different ports on the same resource may result in the receiving device receiving a convoluted signal where multiple reference signals may overlap such that the receiving device may be unable to differentiate between different reference signals from different ports. Such signal processing may prevent the receiving device to properly estimate the channel conditions and provide channel information to the transmitting device.

During transmission, aspects of the present disclosure provide techniques of using cyclic-shifts in CDM to shift the reference signals from different ports as far apart as possible in the time-domain in order to minimize disruptions at the receiving device and allow for proper decoding of the reference signals. It should be appreciated by those of ordinary skill that the techniques disclosed herein are not limited to only reference signals, but may also be adopted for data and control information transmission. In some examples, the data and control information may be interleaved in the same resources, while maintaining adequate diversity (or spacing) between the multiple reference signals, control signals, and/or data from different ports.

Various aspects are now described in more detail with reference to the FIGS. 1-9. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 120 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 125 (e.g., X1, etc.), which may be wired or wireless communication links. In some examples, one or more back stations 105 may include an communication management component 840 to perform one or more techniques of the present disclosure. Components and sub-components of the communication management component 840 are described in detail with reference to FIG. 8.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 130 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. In LTE/LTE-A networks, the term evolved node B (eNB) may be generally used to describe the base stations 105, while the term UE may be generally used to describe the UEs 115. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 115 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication network 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 115 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 115 may be able to communicate with various types of base stations 105 and network equipment including macro eNBs, small cell eNBs, relay base stations, and the like.

A UE 115 may be configured to establish one or more wireless communication links 135 with one or more base stations 105. The wireless communication links 125 shown in wireless communication network 100 may carry UL transmissions from a UE 115 to a base station 105, or downlink (DL) transmissions, from a base station 105 to a UE 110. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the communication links 125 may represent one or more broadcast channels.

In some aspects of the wireless communication network 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

Figure 2:
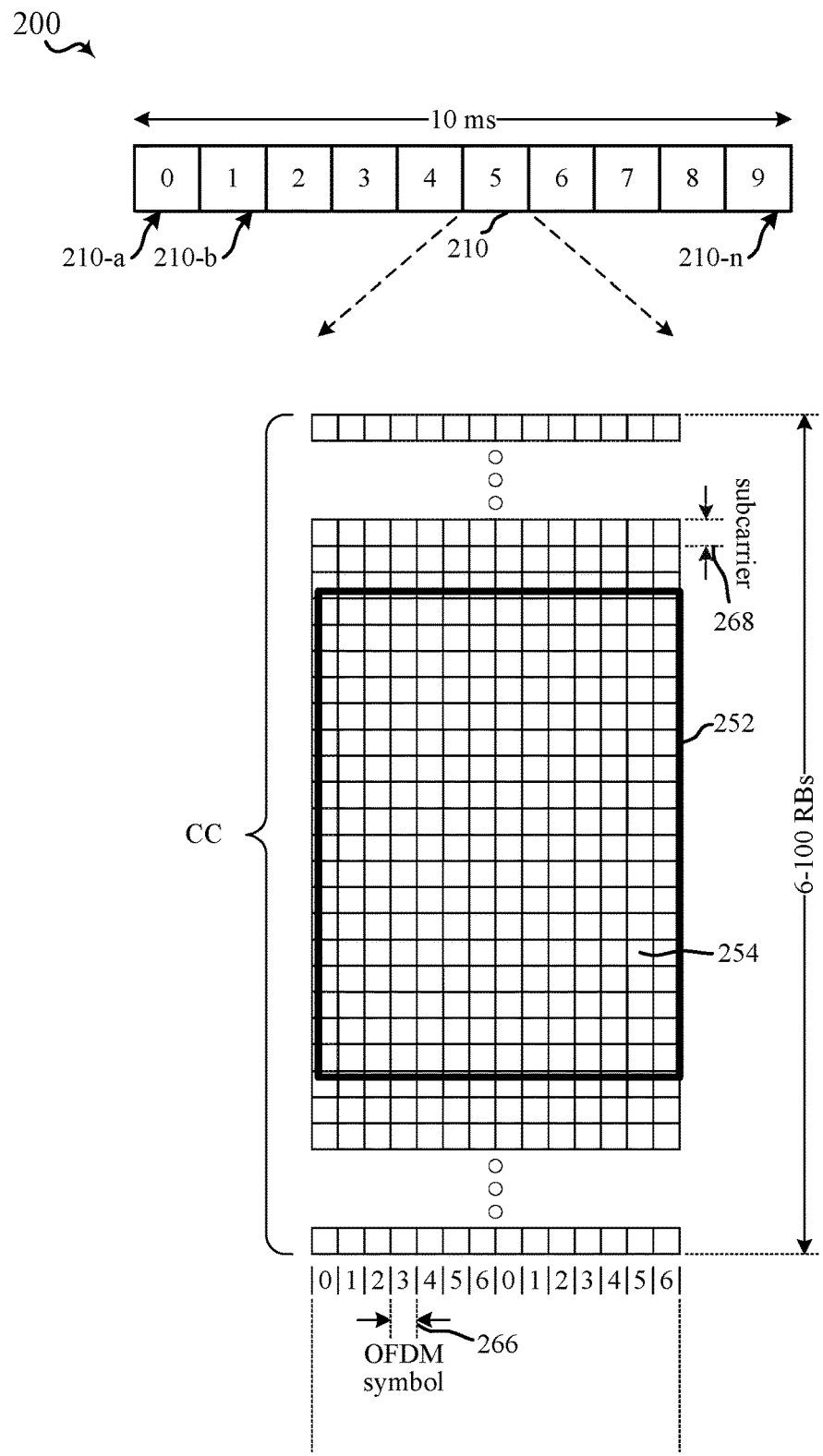
FIG. 2 illustrates an example of a resource grid of a subframe for transmission in accordance with aspects of the present disclosure.

FIG. 2 illustrates an example of a resource grid 200 of a subframe for transmission in accordance with aspects of the present disclosure. In some examples, a radio frame transmitted by the base station (or UE) may include a plurality of subframes 210 (e.g., ten subframes), each subframe 210 further including plurality of slots (downlink and/or uplink) for transmission. The time to transmit one subframe may be defined as a transmission time interval (TTI). In the 3GPP LTE, one subframe 210 may have a length of 1 ms and one slot may have a length of 0.5 millisecond (ms). However, the structure of the radio frame and TTI may be varied according to a communication system. In some examples, 5G New Radio may also be deployed in large bandwidths using OFDM waveform.

One slot (e.g., downlink slot) may include a plurality of OFDMA symbols 266 in the time domain and includes a plurality of resource blocks 252 in the frequency domain. Each resource block 252 may include a plurality of resource elements 254, which are defined as smallest discrete part of the time-frequency resource grid 200 and contains a single complex value representing data or control from a physical channel or signal. The complex value associated with each resource element 254 may be based on the Equation 1 below:

$$y_k = H_k P_k q_k + v_k \qquad \text{(Equation 1)}$$

In Equation 1, $y_k$ may be a receive vector, $H_k$ may be a matrix channel, $P_k q_k$ may be the transmit vector, and $v_k$ may be a noise vector in a MIMO transmission in the $k^{th}$ resource element 254 of an OFDM symbol 266 employing multiple transmit and receive antennas between the transmitting device and the receiving device. In some aspects, the transmit vector (e.g., $P_k q_k$) that may include precoded QAM symbols, may be calculated based on Equation 2 below:

$$P_k q_k = \begin{bmatrix} x_{k,1} \\ \vdots \\ x_{k,L} \end{bmatrix} \quad \text{(Equation 2)}$$

In Equation 2, the value of k may be used to index the one or more resource elements 254 of the same OFDM symbol 266 and L may be the number of MIMO layers (e.g., L QAM symbols transmitted in each resource element). In some aspects, the lower symbols in the equation may represent a vector, while the upper symbols may represent a matrix. As noted above, in OFDM systems, the methods used to multiplex information for transmission (e.g., data, reference signals, and control signals) on the resource grid 200 include: TDM, FDM, and CDM.

As noted, in MIMO systems, separate reference signals may be needed for each transmit antenna in order to accurately estimate the channel conditions. Particularly, in MIMO systems, based on the different beamforming configuration variations available to the transmitter, a transmitting device may transmit independent streams of information using multiple antenna ports such that all information or pilots associated with first type of information may be transmitted and received using the same beamforming configuration and through the same port. Each port, however, may have different properties that affect the delay spread of information (e.g., pilots or data) that may be observed at the receiving device (e.g., UE 115) due to the multipath nature of the wireless systems In some examples, CDM may be employed to multiplex the reference signals from different ports for transmission on the same resources. Aspects of the present disclosure provide techniques of using cyclic-shifts in CDM to shift the reference signals from different ports as far apart in the time domain as possible in order to minimize disruptions at the receiving device due to multipath and allow for proper decoding of the reference signals. In some examples, the transmitting device and the receiving devices may utilize different types of pilots for different ports to obtain channel estimation information. For examples, pilot signals for DMRS ports (e.g., demodulation pilots) may be used to estimate the channel of ports through which data is being transmitted. Additionally or alternatively, pilot signals for CSI-RS and control pilots may be used to determine the state or quality of the port. In some aspects, the number of resource elements (N) that are on the same OFDM symbol may be contiguous (e.g., all consecutive resource elements) or uniformly spaced (e.g., periodic, with equal number of intermediate resource elements separating each resource element).

In accordance with aspects of the present disclosure the use cyclic-shift approach for multiplexing, the transmitting device may use the spreading sequence of the discrete fourier transform (DFT) matrix of N resource elements for each information to be transmitted. An example of the DFT matrix used in connection with the present disclosure is illustrated in Equation 3 below:

$$w = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \cdots & \omega^{(N-1)(N-1)} \end{bmatrix} \begin{matrix} w_0 & w_1 & \cdots & w_n & w_{N-1} \end{matrix} \quad \text{(Equation 3)}$$

In Equation 3, N may represent the number of resource elements of an OFDM symbol that are available for transmission, and ω may be calculated based on Equation 4 below:

$$\omega = e^{-2\pi i/N} \quad \text{(Equation 4)}$$

Figure 3:
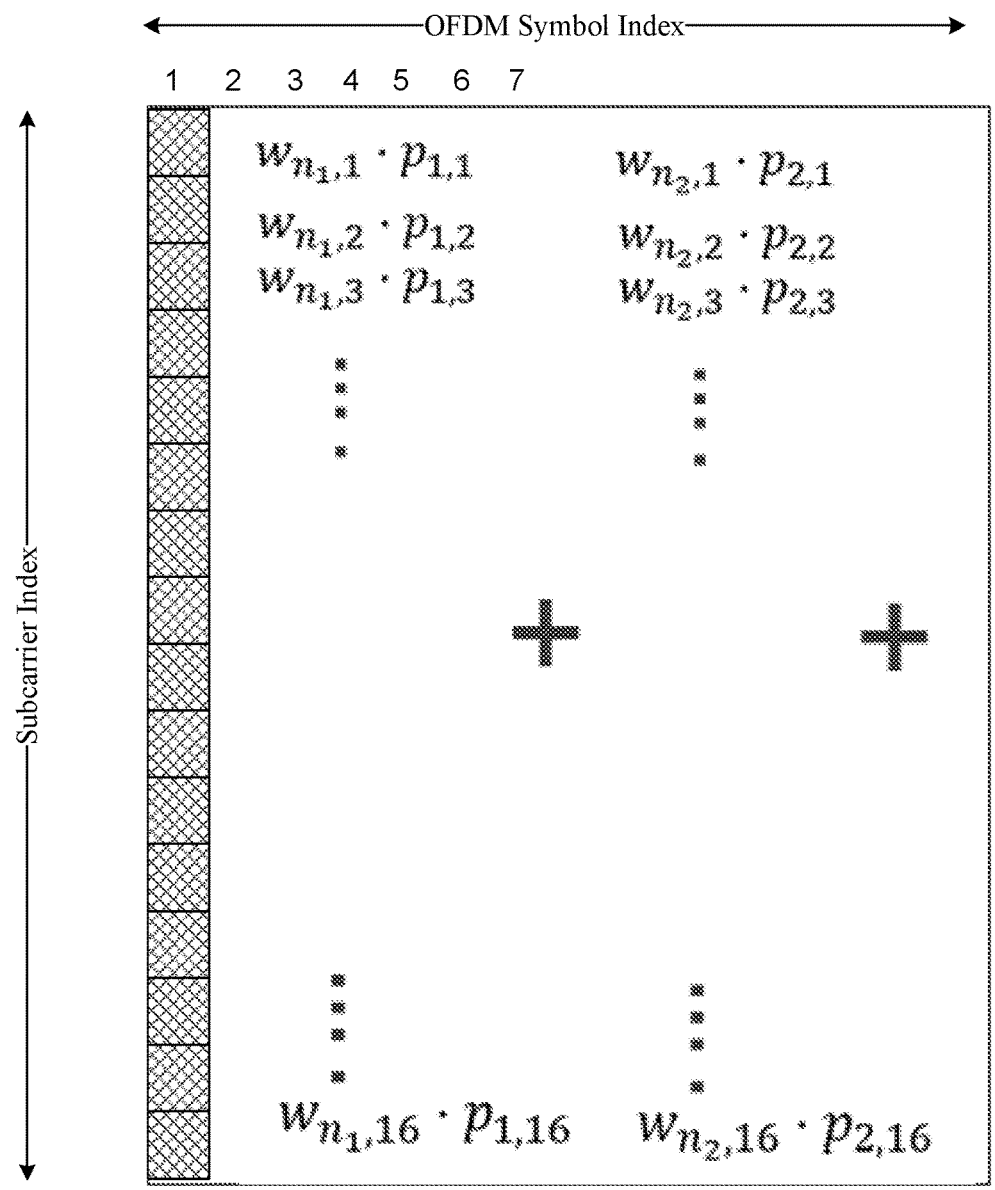
FIG. 3 is a diagram illustrating an example of the cyclic-shift approach for multiplexing on a contiguous resource elements of an OFDM symbol in accordance with aspects of the present disclosure.

FIG. 3 is a diagram 300 illustrating an example of the cyclic-shift approach for multiplexing on a contiguous resource elements of an OFDM symbol in accordance with aspects of the present disclosure. In some examples, the transmitting device may select the transmit pilots (e.g., DMRS, CSI-RS, CRS, tracking reference signal (TRS). using $w_n$ from the nth column of w of Equation 3 above, which means that the nth cyclic shift is assigned for transmitting the pilots. As illustrated in diagram 300, aspects of the present disclosure multiplex the reference signals in the plurality of resource elements through each of a plurality of ports. In FIG. 3, $P_l$ may be the vector that contains the symbols that need to be transmitted through the $1^{st}$ port (e.g., first port or second port).

Accordingly, in some aspects, the transmitting device (e.g., base station 105) may perform a dot-product multiplication (e.g., element by element multiplication with wn and transmit the transmit vector x for each port in the N resource elements based on Equation 5:

$$x \leftarrow x + w_{n,l} P_l \quad \text{(Equation 5)}$$

Figure 4:
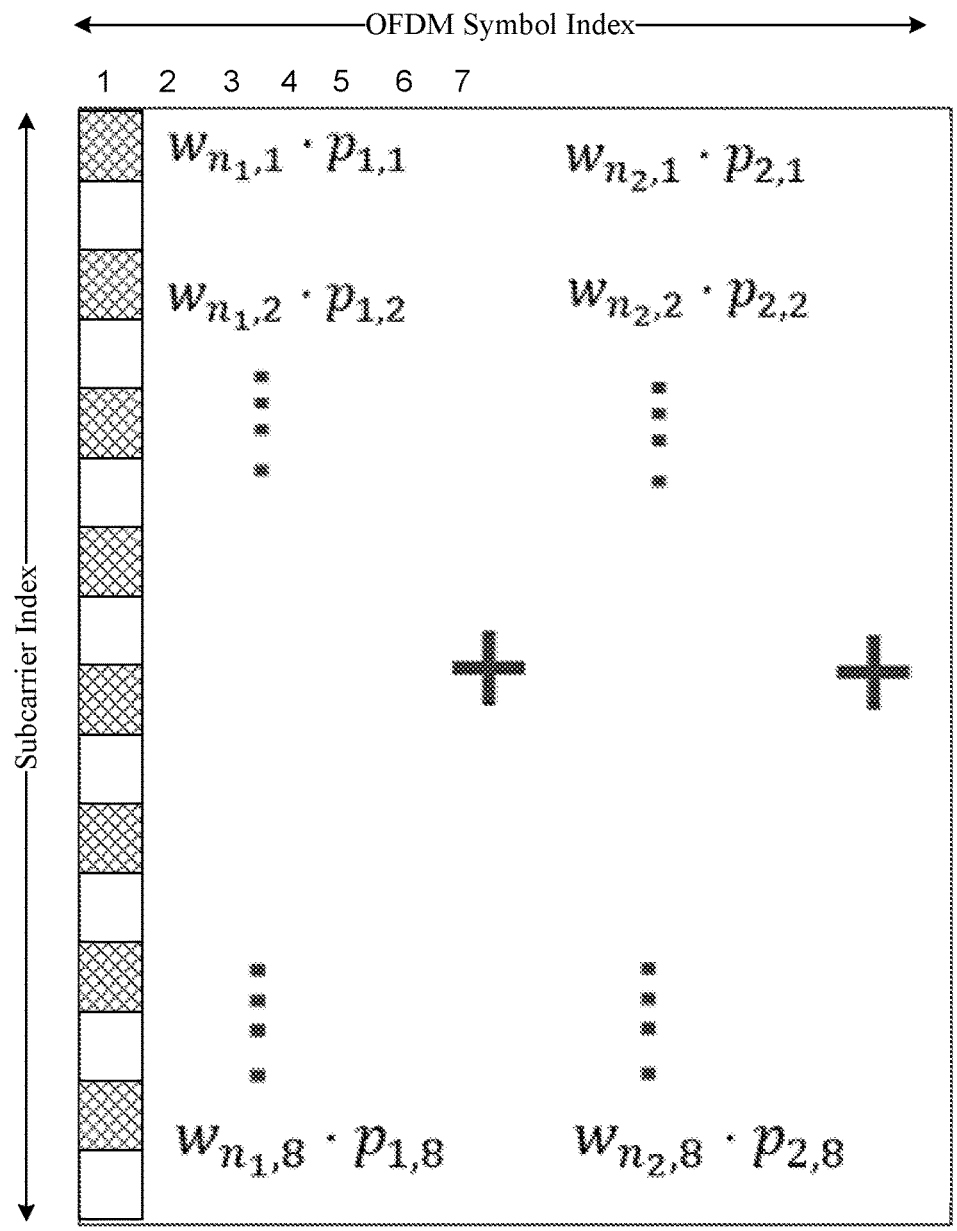
FIG. 4 is a diagram illustrating an example of the cyclic-shift approach for multiplexing on a uniformly spaced resource elements of an OFDM symbol in accordance with aspects of the present disclosure.

In contrast to FIG. 3 that illustrates an example of multiplexing on a contiguous resource elements, FIG. 4 is a diagram 400 illustrating an example of the cyclic-shift approach for multiplexing on a uniformly spaced resource elements of an OFDM symbol in accordance with aspects of the present disclosure. As noted, aspects of the present disclosure may not be limited to only contiguous resource elements, but the techniques described above may be adapted for uniformly spaced resource elements that may carry different signals from different ports over the same resources.

Figure 5:
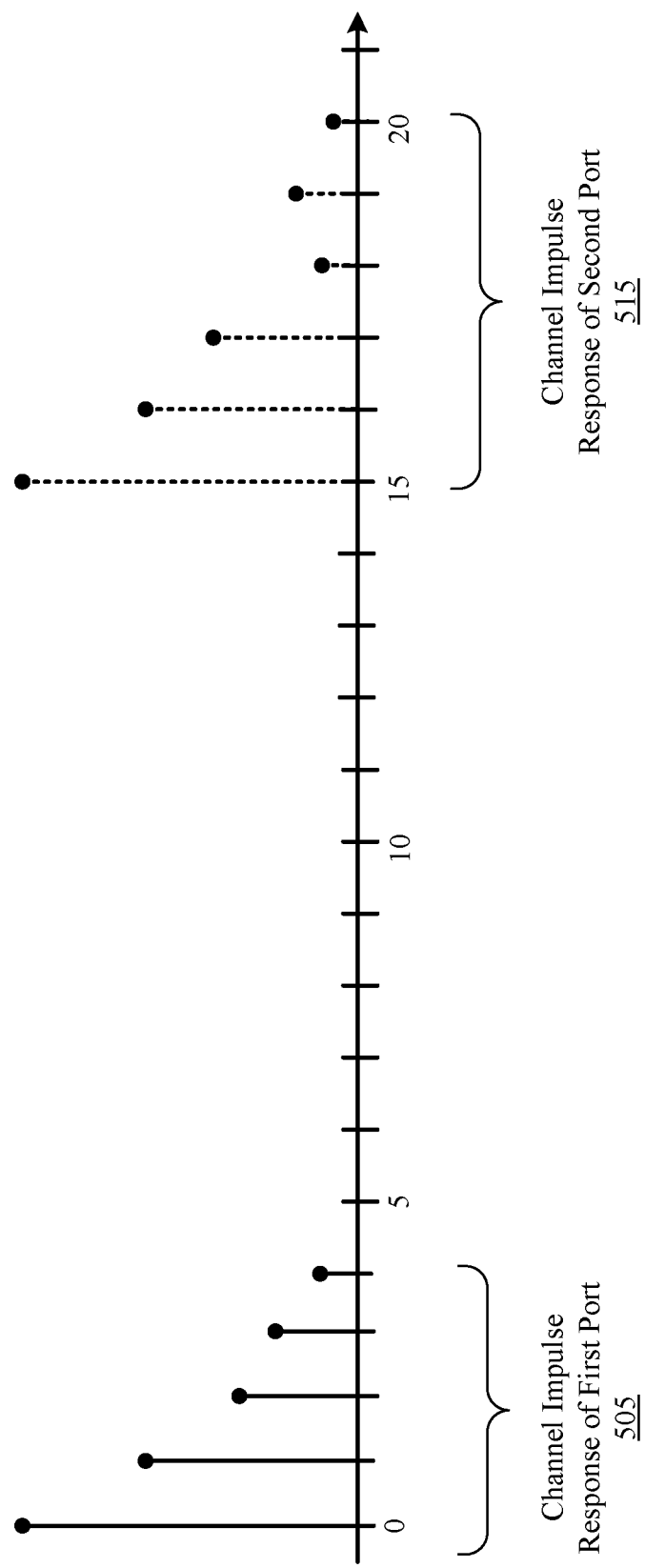
FIG. 5 is a diagram illustrating an example of cyclic shift assignment per OFDM symbol based on the delay spread of the first port and the second port of the transmitting device in accordance with aspects of the present disclosure.

FIG. 5 is a diagram 500 illustrating an example of cyclic shift assignment per OFDM symbol based on the delay spread of the first port and the second port of the transmitting device in accordance with aspects of the present disclosure. Diagram 500 illustrates a graphic representation of the amplitude of the received signal in the resource elements (e.g., 32 resource elements) after applying the inverse fourier transform. As discussed above, each port may exhibit different delay spreads. Thus, the channel impulse response for the first port 505 (5 taps shown with solid lines in FIG. 5) may be different than the channel impulse response for the second port 515 (6 taps shown with dotted in FIG. 5). To that end, aspects of the present disclosure may utilize power delay profiles (e.g., squared value of the channel impulse response that may capture the energy/power of each port) for transmissions of data on the available cyclic shifts for an OFDM symbol.

Aspects of the present disclosure provide techniques of using cyclic shift multiplexing in order to shift the signals from each port as far apart as possible such that the channels of each port may appear separated for the receiving device. Absent the utilization of the techniques described herein that account for the delay spread of each antenna port when multiplexing the signals on the same OFDM, signals from different ports transmitted in either overlapping or adjacent taps (or cyclic shift) may impede the receiving device from differentiating between the two channels (e.g., the receiving device may assume that the received signal from different ports is from one port).

Thus, as illustrated, the transmitter in the present case may transmit signals from the first port using $W_0$ and the second port using $W_{15}$. Although the transmitting device may transmit the information (e.g., DMRS, CSI-RS, CRS, data, or control) on two resource elements for two different ports, each channel of each port may appear in more than one tap due to the fact that the UE receives multiple versions of the same information because of the multipath nature of the wireless channels. Such property may be due to the delay spread of the channel, and is defined as the channel impulse response of the antenna port. By separating signals from different ports with cyclic-shifts, the transmitting device may ensure that the signal from one port (e.g., first port) does not interfere with the signal from a different port (e.g., second port) when accounting for the delay spread, that is the channel impulse response of one antenna port does not collide with the channel impulse response of a second port.

To achieve proper diversity, the transmitting device may first determine (or estimate) the delay spread of each port prior to assigning each signal a resource element for transmission. Thus, for every port for which the transmitting device transmits reference signals, an associated number of taps may need to be defined that account for the delay spread of each antenna port. For example, the transmitting device may identify a first delay spread for the DMRS antenna port, a second delay spread for CSI-RS antenna port, and a third delay spread for CRS antenna port. In one or more examples, DMRS may be defined as reference signals used for demodulation and to estimate the antenna port through which the data is to be transmitted. Additionally or alternatively, CSI-RS may be reference signals used for estimating the channel quality and channel information of an antenna port, and CRS may be reference signals that are used for estimating the port through which control information may be transmitted. It should be appreciated that the CRS estimation may be UE or non-UE specific. By determining the delay spreads of the respective ports, the transmitting device may ensure that the cyclic shifts adjacent to the cyclic shift chosen for each antenna port is not used for any other transmission.

Figure 6A:
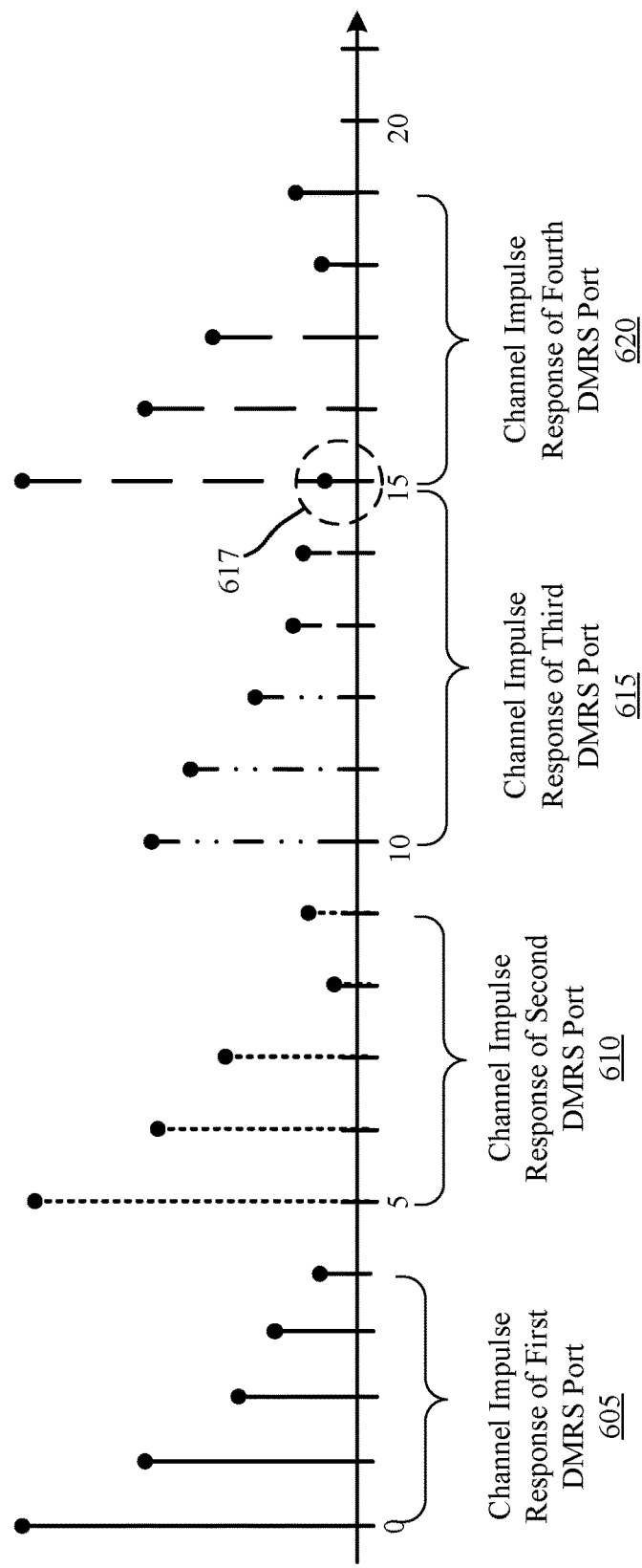
FIG. 6A is a diagram illustrating an overlap assignment based on miscalculation of delay spread in accordance with aspects of the present disclosure.
Figure 6B:
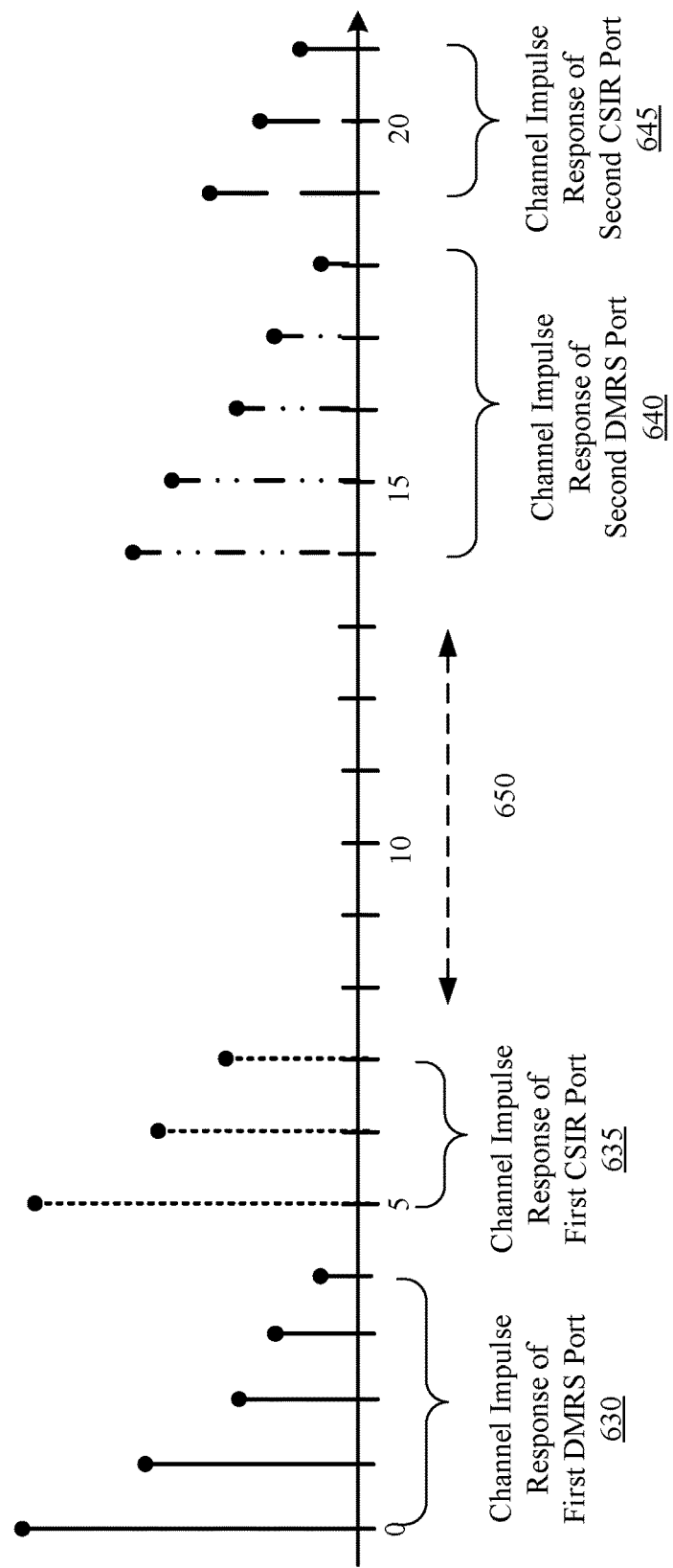
FIG. 6B is a diagram illustrating an assignment of spacing the tones associated with each port in accordance with aspects of the present disclosure.
Figure 6C:
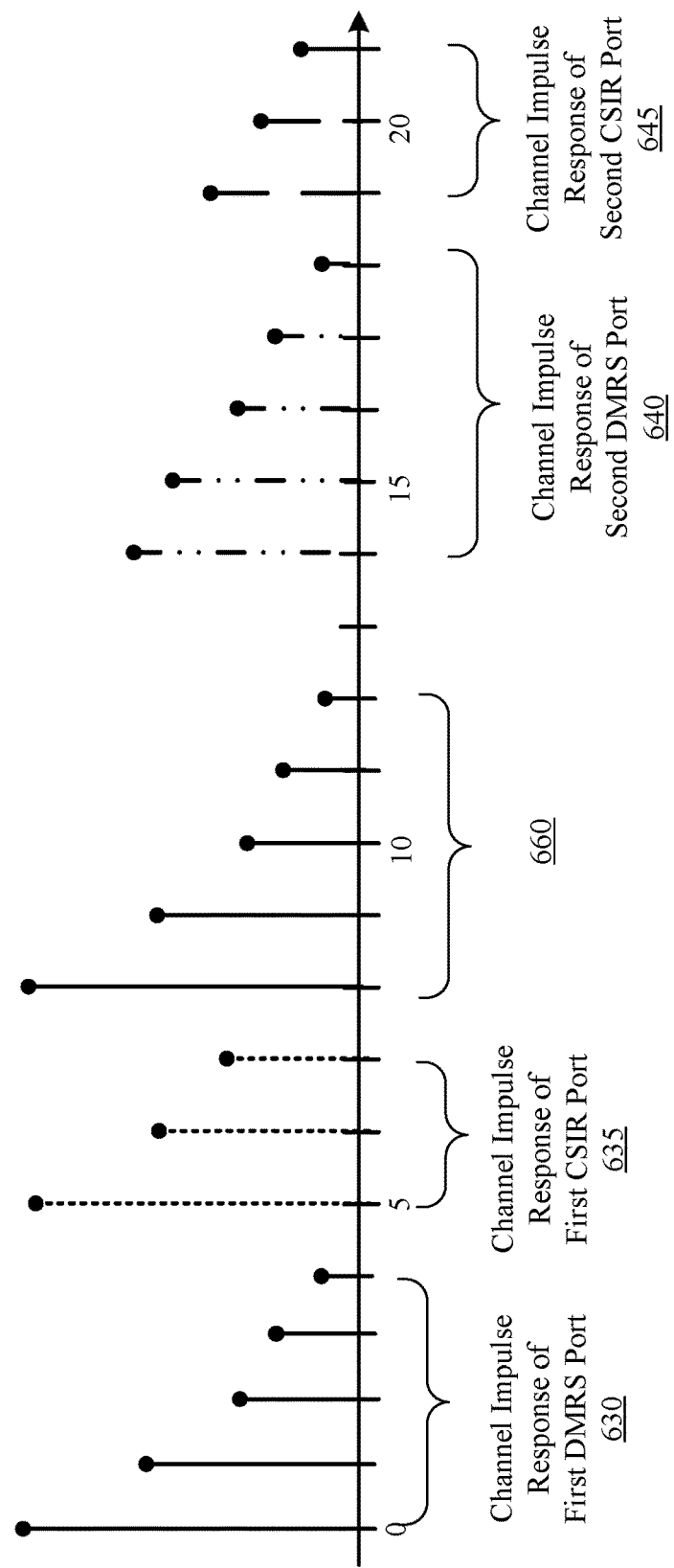
FIG. 6C illustrates one instance where data may also be multiplexed in the resource elements for an OFDM symbol.

However, aspects of the present disclosure may also maximize the available resources by identifying the remaining cyclic shifts (e.g., 5-14 taps in FIG. 5) that may carry additional data and/or control information. Such implementation is illustrated in FIGS. 6A-6C. First, FIG. 6A is a diagram 600 illustrating an overlap assignment based on miscalculation of one delay spread in accordance with aspects of the present disclosure. In the illustrated example, the transmitting device may assign cyclic shifts to pilots signals (e.g., DMRS) with the same delay spread assumption (e.g., $K_{dmrs}$=5) to maximize the available resources. Thus, the transmitting device may utilize one or more DMRS ports to transmit data on available cyclic shifts for an OFDM symbol, each having a delay spread. For example, the first DMRS port may have a first channel impulse response 605 (shown with solid lines in FIG. 6A), a second DMRS port may have a second channel impulse response (shown with dotted lines in FIG. 5), etc. In the illustrated example, the transmitting device may transmit with an assumption that each pilot signal may have the same delay spread (e.g., channel impulse response of 5 taps). However, as illustrated in one example, the channel impulse response of third DMRS port 615 of a signal may be different or greater (see e.g., six taps) than estimated delay spread of multiple ports. As such, at 617 (tap 15), the receiving device may receive multiple signals from different ports on the same resource element. Aspects of the present disclosure correct such errors that may occur due to improper assumptions by first assigning a first set of pilot signals for the first antenna port to a first cyclic shift of a subframe based on the first delay spread and determining remaining available cyclic shifts for OFDM of the subframe before assigning a second set of pilots for a second antenna port to a second cyclic shift of subframe based on the remaining available cyclic shifts.

FIG. 6B, for example, illustrates a diagram 625 with adequate spacing of the tones associated with each port in accordance with aspects of the present disclosure. In the illustrated example, the transmitting device may transmit first set of pilot signals 630 (e.g., DMRS) via the first type of port (e.g., DMRS ports) and cyclic shift multiplex the second set of pilot signals 635 (e.g., CSI-RS) via the second type of port (e.g., CSI-RS). In some examples, the transmitting device may assign the first set of pilots of first type (e.g., DMRS) at from the first port using $W_0$ and the second port using $W_{15}$. Thereafter, the transmitting device may determine the remaining available cyclic shifts. If there exists available cyclic shifts, the transmitting device may assign the second set of pilots 645 of second type (e.g., CSI-RS) using $W_5$ and the second port using $W_{21}$. Upon assigning the second set of pilots, the transmitting device may again determine any remaining cyclic shifts that may carry information (e.g., data and/or control) without interfering with the channel impulse response of each port. Thus, in some examples, even after allocating a plurality of pilots from different ports, there may be resources available 650 to carry information (e.g., taps 8-13). The features of the present disclosure determine techniques to best utilize such resources and the cyclic shift to apply that may achieve the greatest diversity between the signals from different ports. FIG. 6C illustrates one instance where data may also be multiplexed in the resource elements for an OFDM symbol (see tap 8-12). Specifically, FIG. 6C includes a diagram 655 that maximizes the use of available resources 660 by assigning a set of pilot signals from one or a first antenna port or a second antenna port for transmission to the UE at the allocated resource elements.

Figure 7:
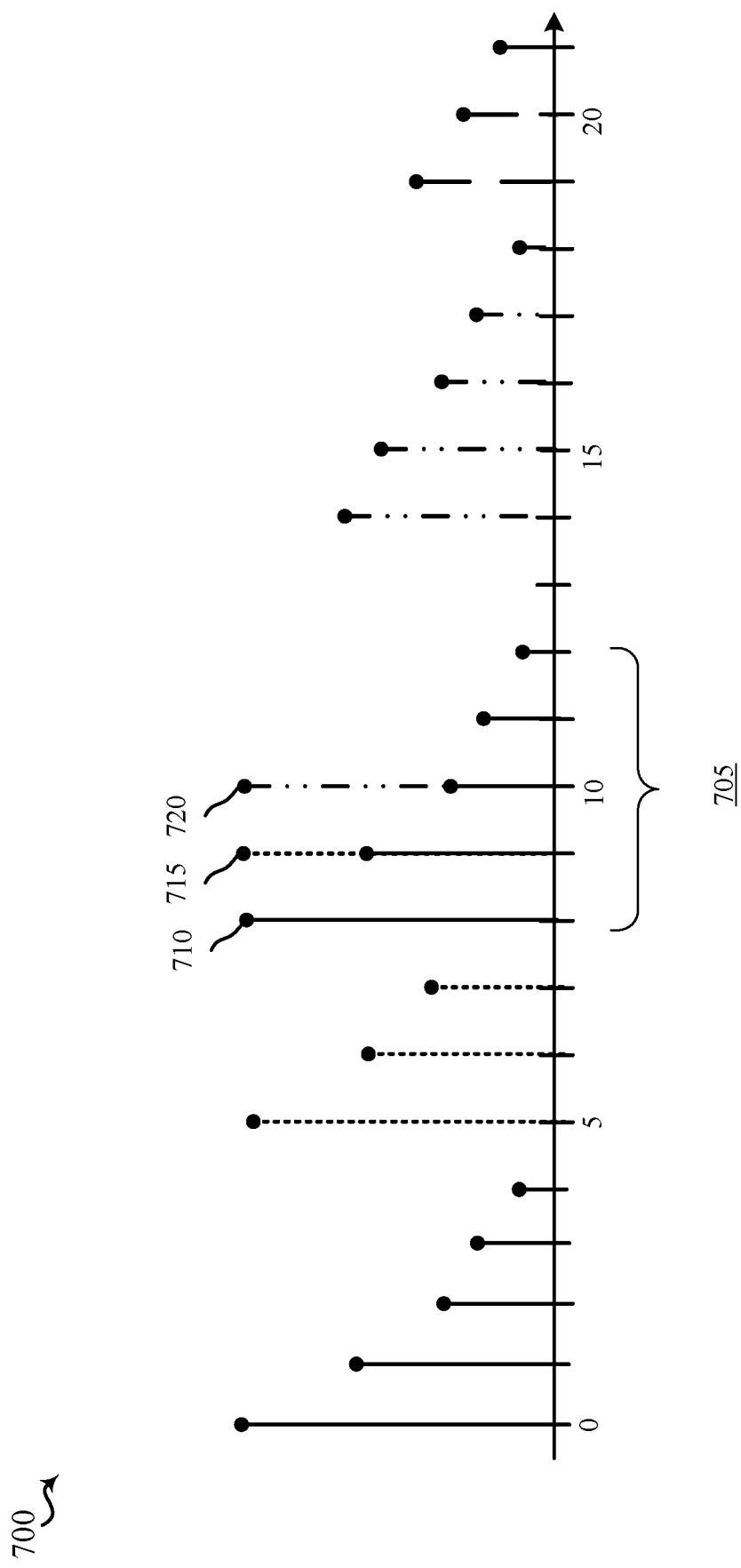
FIG. 7 is a diagram of joint demodulation implementation where cyclic shifts with overlapping delay spreads may be utilized to transmit information.
Figure 8:
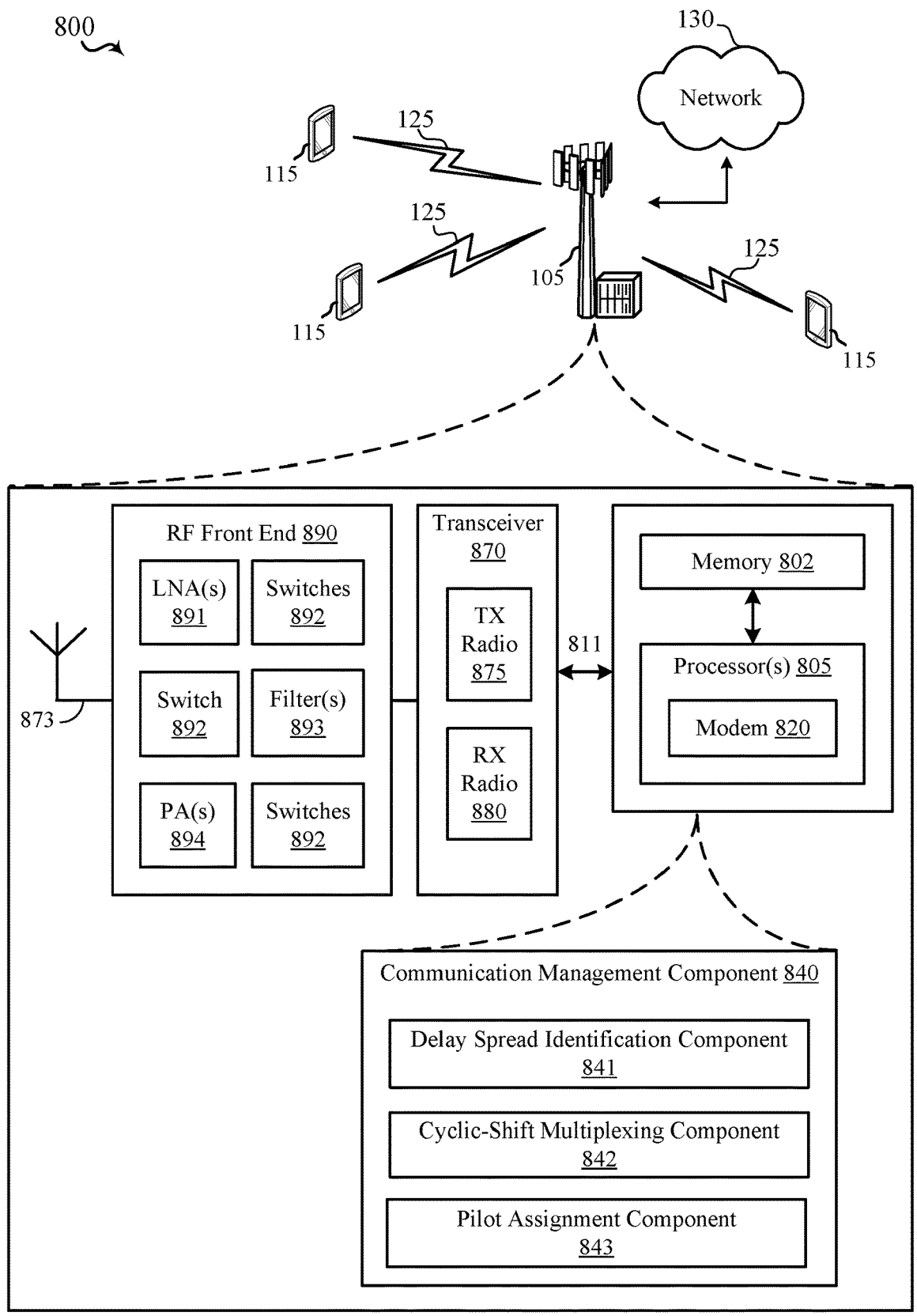
FIG. 8 describes hardware components and subcomponents of a device that may be a transmitting device (e.g., a base station 105) for implementing one or more methods (e.g., method 900) described herein in accordance with various aspects of the present disclosure.

FIG. 7 is a diagram 700 illustrating an example of cyclic shift assignment per OFDM symbol for facilitating joint demodulation in accordance with aspects of the present disclosure. In some aspects, where the receiving device supports the capability to equalize the received channels, the transmitting device may use all the cyclic shifts to transmit data, including overlapping the signals due to the channel impulse response (see e.g., Taps 8, 9, and 10). For example, in the illustrated example, the QAM symbol at tap 8 for signal 710 may be transmitted using $W_8$ value from Equation 3, the QAM symbol at tap 9 for signal 715 may be transmitted using $W_9$ value from Equation 3, and the QAM symbol at tap 10 for signal 720 may be transmitted using $W_{10}$ value from Equation 3, FIG. 8 describes hardware components and subcomponents of a device that may be a transmitting device (e.g., a base station 105) for implementing one or more methods (e.g., method 900) described herein in accordance with various aspects of the present disclosure. For example, one example of an implementation of the transmitting device may include a variety of components, some of which have already been described above, but including components such as one or more processors 812 and memory 816 and transceiver 802 in communication via one or more buses 811, which may operate in conjunction with the communication management component 840 to enable signal generation that allows for one or more receiving device (e.g., UEs 115) to properly decode the received signal. Thus, the communication management component 840 may perform functions described herein related to including one or more methods of the present disclosure.

The one or more processors 812, modem 814, memory 816, transceiver 802, RF front end 888 and one or more antennas 865, may be configured to support voice and/or data calls (simultaneously or non-simultaneously) in one or more radio access technologies. In an aspect, the one or more processors 812 can include a modem 814 that uses one or more modem processors. The various functions related to communication management component 840 may be included in modem 814 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with communication management component 850 may be performed by transceiver 802.

Also, memory 816 may be configured to store data used herein and/or local versions of applications or communication management component 840 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining communication management component 840 and/or one or more of its subcomponents, and/or data associated therewith, when UE 115 is operating at least one processor 812 to execute communication management component 840 and/or one or more of its subcomponents.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one UE 115. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, transmitting device may include RF front end 888, which may operate in communication with one or more antennas 865 and transceiver 802 for receiving and transmitting radio transmissions, for example, wireless communications transmitted by at least one base station 105 or wireless transmissions transmitted by UE 115. RF front end 890 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 891 can amplify a received signal at a desired output level. In an aspect, each LNA 891 may have a specified minimum and maximum gain values. In an aspect, RF front end 890 may use one or more switches 892 to select a particular LNA 891 and its specified gain value based on a desired gain value for a particular application.

Further, for example, one or more PA(s) 894 may be used by RF front end 890 to amplify a signal for an RF output at a desired output power level. In an aspect, each PA 894 may have specified minimum and maximum gain values. In an aspect, RF front end 890 may use one or more switches 892 to select a particular PA 894 and its specified gain value based on a desired gain value for a particular application.

Also, for example, one or more filters 893 can be used by RF front end 890 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 891 and/or PA 894. In an aspect, RF front end 890 can use one or more switches 892 to select a transmit or receive path using a specified filter 893, LNA 891, and/or PA 894, based on a configuration as specified by transceiver 870 and/or processor 905.

As such, transceiver 870 may be configured to transmit and receive wireless signals through one or more antennas 873 via RF front end 890. In an aspect, transceiver may be tuned to operate at specified frequencies such that transmitting device can communicate with, for example, one or more base stations 105 or one or more cells associated with one or more base stations 105. In an aspect, for example, modem 820 can configure transceiver 870 to operate at a specified frequency and power level based on the configuration of the transmitting device and the communication protocol used by modem 820.

In an aspect, modem 820 can be a multiband-multimode modem, which can process digital data and communicate with transceiver 870 such that the digital data is sent and received using transceiver 870. In an aspect, modem 820 can be multiband and be configured to support multiple frequency bands for a specific communications protocol. In an aspect, modem 820 can be multimode and be configured to support multiple operating networks and communications protocols. In an aspect, modem 820 can control one or more components of transmitting device (e.g., RF front end 890, transceiver 870) to enable transmission and/or reception of signals from the network based on a specified modem configuration. In an aspect, the modem configuration can be based on the mode of the modem and the frequency band in use. In another aspect, the modem configuration can be based on UE configuration information associated with transmitting device as provided by the network during cell selection and/or cell reselection.

Figure 9:
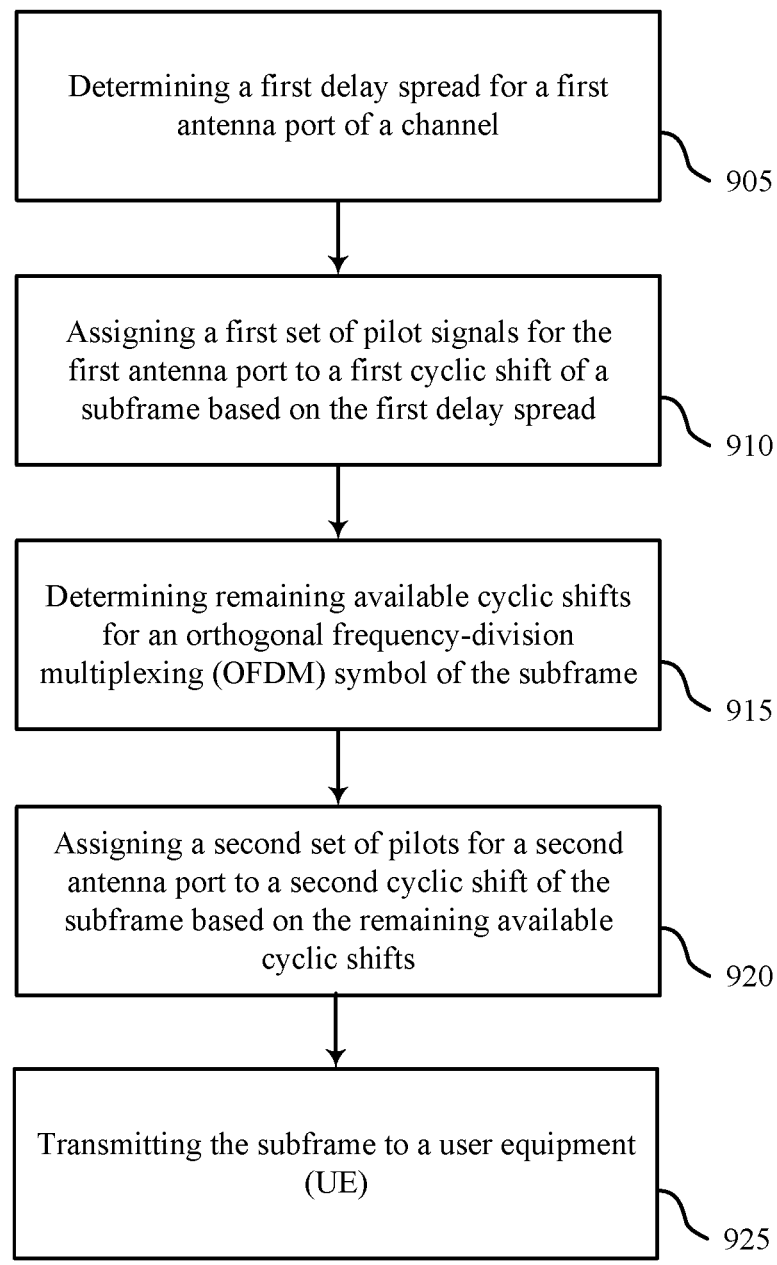
FIG. 9 is an example method performed by the transmitting device in accordance with aspects of the present disclosure.

FIG. 9 is a flowchart of an example method 900 for transmitting subframes in wireless communications in accordance with aspects of the present disclosure. The method 900 may be performed using an apparatus (e.g., the base station 105). In some examples, the methods of the present disclosure may allow a receiving device (e.g., UE 115) to improve channel estimation performance. Although the method 900 is described below with respect to the elements of the transmitting device (e.g., the base station 105), other components may be used to implement one or more of the steps described herein.

At block 905, the method may determining a first delay spread for a first antenna port of a channel. In some aspects, the base station 105 may determine the delay spread by estimating the delay spread and receiving feedback on the accuracy of the estimation from the UE based on the delay spread observed at the UE. Thus, in some examples, the base station 105 may dynamically adjust the calculation of the delay spread associated with the antenna port for each subframe based on information returned from the UE. Accordingly, in some examples, the base station 105 may receive a delay spread feedback from the UE and determine an updated first delay spread and/or the second delay spread based on the delay spread feedback. Based on the updated information regarding the first delay spread and/or second delay spread, the base station 105 may adjust the assignment of the second set of pilot signals and/or the second set of pilot signals. In some aspects, the first delay spread may identify a channel impulse response of a first antenna port observed at the UE, and the second delay spread may identify a channel impulse response of the second antenna port observed at the UE. In some examples, the chosen cyclic shift for each antenna port may also depend on a function of the channel impulse response or the power delay profile of the antenna port (e.g., the squared value of the channel impulse response such that the value reflects the energy of each path). Thus, in some aspects, delay spread may refer to one or more: mean, R.M.S., or max of the one or both of power delay profile or channel impulse response of the antenna port. Aspects of block 905 may be performed by delay spread identification component 841 described with reference to FIG. 8.

At block 910, the method may include assigning a first set of pilot signals for the first antenna port to a first cyclic shift of a subframe based on the first delay spread. Aspects of block 910 may be performed by pilot assignment component 843 described with reference to FIG. 8.

At block 915, the method may include determining remaining available cyclic shifts for an OFDM symbol of the subframe. Aspects of block 915 may be performed by cyclic-shift multiplexing component 842 described with reference to FIG. 8.

At block 920, the method may include assigning a second set of pilots for a second antenna port to a second cyclic shift of the subframe based on the remaining available cyclic shifts. In some examples, assigning the second set of pilots for the second antenna port to the second cyclic shift may comprise determining a second delay spread for the second antenna port of the channel, and assigning the second set of pilots for the second antenna port to the second cyclic shift based on a determination that the remaining available cyclic shifts would accommodate the second delay spread for the second antenna port. Aspects of block 920 may be performed by pilot assignment component 843 described with reference to FIG. 8.

At block 925, the method may include transmitting the subframe to the UE. Aspects of block 925 may be performed by transceiver 870 described with reference to FIG. 8.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD- ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications for a base station, comprising:
   determining a first delay spread for a first antenna port of a first channel;
   assigning a first pilot signal for the first antenna port to a first cyclic shift of a symbol of a subframe based at least in part on the first delay spread;
   determining a second delay spread for a second antenna port of a second channel, wherein the first antenna port and the second antenna port are different;
   determining a second cyclic shift of the symbol spaced from the first cyclic shift based on a maximum separation of the first channel for the first pilot signal and the second channel for a second pilot signal within the subframe;
   assigning the second pilot signal for the second antenna port to the second cyclic shift of the symbol of the subframe based at least in part on one or both of the first delay spread or the second delay spread, wherein the first pilot signal and the second pilot signal are for a same pilot type;
   determining remaining available cyclic shifts for the symbol of the subframe; and
   multiplexing data on the remaining available cyclic shifts for the symbol, wherein the data is transmitted by one or both of the first antenna port or the second antenna port.

2. The method of claim 1, wherein determining the remaining available cyclic shifts for the symbol of the subframe comprises:
   determining a number of cyclic shifts allocated to the first pilot signal and the second pilot signal based on the first delay spread and the second delay spread; and
   adjusting a cyclic shift budget of the transmitting device for the symbol of the subframe by subtracting the number of cyclic shifts from the cyclic shift budget.

3. The method of claim 1, wherein multiplexing the data on the remaining available cyclic shifts for the symbol, comprises:
   identifying the first antenna port or the second antenna port to transmit the multiplexed data on the symbol, wherein the first antenna port or the second antenna port is identified based on an estimation performed using pilot signals transmitted on a different orthogonal frequency-division multiplexing (OFDM) symbol.

4. The method of claim 1, further comprising:
   transmitting the symbol of the subframe to a user equipment (UE).

5. The method of claim 1, wherein assigning the second pilot signal for the second antenna port to the second cyclic shift, comprises:
   determining the second delay spread for the second antenna port of the second channel; and
   assigning the second set of pilots for the second antenna port to the second cyclic shift based on a determination that the remaining available cyclic shifts would accommodate the second delay spread for the second antenna port and that the transmission of the second set of pilots using the second cyclic shift will not lead to interference to the first antenna port.

6. The method of claim 1, wherein:
the first delay spread identifies a channel impulse response of the first antenna port observed at the UE, and
the second delay spread identifies a channel impulse response of the second antenna port observed at the UE.

7. The method of claim 1, further comprising:
receiving a delay spread feedback from the UE;
determining an updated first delay spread or the second delay spread based on the delay spread feedback; and
adjusting a number of data symbols that can be multiplexed based on the available cyclic shifts after the delay spread adjusting.

8. The method of claim 1, wherein the first antenna port is a demodulation reference signal (DMRS) antenna port and the second antenna port is one of a channel state information-reference signal (CSI-RS), a cell-specific reference signal (CRS) antenna port, or tracking reference signal (TRS).

9. An apparatus for wireless communications, comprising:
a memory configured to store instructions;
a processor communicatively coupled with the memory, the processor configured to execute the instructions to:
determine a first delay spread for a first antenna port of a first channel;
assign a first pilot signal for the first antenna port to a first cyclic shift of a symbol of a subframe based at least in part on the first delay spread;
determine a second delay spread for a second antenna port of a second channel, wherein the first antenna port and the second antenna port are different;
determine a second cyclic shift of the symbol spaced from the first cyclic shift based on a maximum separation of the first channel for the first pilot signal and the second channel for a second pilot signal within the subframe;
assign the second pilot signal for the second antenna port to the second cyclic shift of the symbol of the subframe based at least in part on one or both of the first delay spread the second delay spread, wherein the first pilot signal and the second pilot signal are for a same pilot type;
determine remaining available cyclic shifts for the symbol of the subframe; and
multiplex data on the remaining available cyclic shifts for the symbol, wherein the data is transmitted by one or both of the first antenna port or the second antenna port.

10. The apparatus of claim 9, wherein the processor is configured to execute the instructions to determine the remaining available cyclic shifts for the symbol of the subframe further include instructions to:
determine a number of cyclic shifts allocated to the first pilot signal and the second pilot signal based on the first delay spread and the second delay spread; and
adjust a cyclic shift budget of the transmitting device for the symbol of the subframe by subtracting the number of cyclic shifts from the cyclic shift budget.

11. The apparatus of claim 9, wherein the processor is configured to execute the instructions to multiplex the data on the remaining available cyclic shifts for the symbol further include instructions to:
identify the first antenna port or the second antenna port to transmit the data on the symbol, wherein the first antenna port or the second antenna port is identified based on an estimation performed using pilot signals transmitted on a different orthogonal frequency-division multiplexing (OFDM) symbol.

12. The apparatus of claim 9, wherein the processor is configured to execute the instructions to:
transmit the symbol of the subframe to a user equipment (UE).

13. The apparatus of claim 9, wherein the instructions to assign the second set of pilots for the second antenna port to the second cyclic shift further include instructions to:
determine a second delay spread for the second antenna port of the second channel; and
assign the second set of pilots for the second antenna port to the second cyclic shift based on a determination that the remaining available cyclic shifts would accommodate the second delay spread for the second antenna port.

14. The apparatus of claim 9, wherein:
the first delay spread identifies a channel impulse response of the first antenna port observed at the UE, and
the second delay spread identifies a channel impulse response of the second antenna port observed at the UE.

15. The apparatus of claim 9, further comprising instructions to:
receive a delay spread feedback from the UE;
determine an updated first delay spread or the second delay spread based on the delay spread feedback; and
adjust a number of data symbols that can be multiplexed based on the available cyclic shifts after the delay spread adjusting.

16. The apparatus of claim 9, wherein the first antenna port is a demodulation reference signal (DMRS) antenna port and the second antenna port is one of a channel state information-reference signal (CSI-RS) or a cell-specific reference signal (CRS) antenna port.

17. A non-transitory computer readable medium for wireless communications, comprising code for:
determining a first delay spread for a first antenna port of a first channel;
assigning a first pilot signal for the first antenna port to a first cyclic shift of a symbol of a subframe based at least in part on the first delay spread;
determining a second delay spread for a second antenna port of a second channel, wherein the first antenna port and the second antenna port are different;
determining a second cyclic shift of the symbol spaced from the first cyclic shift based on a maximum separation of the first channel for the first pilot signal and the second channel for a second pilot signal within the subframe;
assigning the second pilot signal for the second antenna port to the second cyclic shift of the symbol of the subframe based at least in part on one or more of the first delay spread the second delay spread, wherein the first pilot signal and the second pilot signal are for a same pilot type;
determining remaining available cyclic shifts for the symbol of the subframe; and
multiplexing data on the remaining available cyclic shifts for the symbol, wherein the data is transmitted by one or both of the first antenna port or the second antenna port.

18. The non-transitory computer readable medium of claim 17, wherein the code for determining the remaining available cyclic shifts for the symbol of the subframe further includes code for:
determining a number of cyclic shifts allocated to the first pilot signal and the second pilot signal based on the first delay spread and the second delay spread; and adjusting a cyclic shift budget of the transmitting device for the symbol of the subframe by subtracting the number of cyclic shifts from the cyclic shift budget.

19. The non-transitory computer readable medium of claim 17, wherein the code for multiplexing the data on the remaining available cyclic shifts for the symbol further includes code for:
identifying the first antenna port or the second antenna port to transmit the data on the symbol, wherein the first antenna port or the second antenna port is identified based on an estimation performed using pilot signals transmitted on a different orthogonal frequency-division multiplexing (OFDM) symbol.

20. The non-transitory computer readable medium of claim 17, further comprising code for:
transmitting the symbol of the subframe to a user equipment (UE).

21. The non-transitory computer readable medium of claim 17, wherein the code for assigning the second set of pilots for the second antenna port to the second cyclic shift further includes code for:
determining a second delay spread for the second antenna port of the second channel; and
assigning the second set of pilots for the second antenna port to the second cyclic shift based on a determination that the remaining available cyclic shifts would accommodate the second delay spread for the second antenna port.

22. The non-transitory computer readable medium of claim 17, wherein:
the first delay spread identifies a channel impulse response of the first antenna port observed at the UE, and
the second delay spread identifies a channel impulse response of the second antenna port observed at the UE.

23. The non-transitory computer readable medium of claim 17, further comprising code for:
receiving a delay spread feedback from the UE;
determining an updated first delay spread or the second delay spread based on the delay spread feedback; and
adjusting a number of data symbols that can be multiplexed based on the available cyclic shifts after the delay spread adjusting.

24. The non-transitory computer readable medium of claim 17, wherein the first antenna port is a demodulation reference signal (DMRS) antenna port and the second antenna port is one of a channel state information-reference signal (CSI-RS) or a cell-specific reference signal (CRS) antenna port.

25. An apparatus for wireless communications, comprising:
means for determining a first delay spread for a first antenna port of a first channel;
means for assigning a first pilot signal for the first antenna port to a first cyclic shift of a symbol of a subframe based at least in part on the first delay spread;
means for determining a second delay spread for a second antenna port of a second channel, wherein the first antenna port and the second antenna port are different;
means for determining a second cyclic shift of the symbol spaced from the first cyclic shift based on a maximum separation of the first channel for the first pilot signal and the second channel for a second pilot signal within the subframe;
means for assigning the second pilot signal for the second antenna port to the second cyclic shift of the symbol of the subframe based at least in part on one or more of the first delay spread the second delay spread, wherein the first pilot signal and the second pilot signal are for a same pilot type;
means for determining remaining available cyclic shifts for the symbol of the subframe; and
means for multiplexing data on the remaining available cyclic shifts for the symbol, wherein the data is transmitted by one or both of the first antenna port or the second antenna port.

26. The apparatus of claim 25, wherein the means for determining the remaining available cyclic shifts for the symbol of the subframe further comprises:
means for determining a number of cyclic shifts allocated to the first pilot signal and the second pilot signal based on the first delay spread and the second delay spread; and
means for adjusting a cyclic shift budget of the transmitting device for the symbol of the subframe by subtracting the number of cyclic shifts from the cyclic shift budget.

27. The apparatus of claim 25, wherein the means for multiplexing the data on the remaining available cyclic shifts for the symbol further comprises:
means for identifying the first antenna port or the second antenna port to transmit the data on the symbol, wherein the first antenna port or the second antenna port is identified based on an estimation performed using pilot signals transmitted on a different orthogonal frequency-division multiplexing (OFDM) symbol.

28. The apparatus of claim 25, further comprising:
means for transmitting the symbol of the subframe to a user equipment (UE).

29. The apparatus of claim 25, wherein the means for assigning the second set of pilots for the second antenna port to the second cyclic shift further includes:
means for determining a second delay spread for the second antenna port of the second channel; and
means for assigning the second set of pilots for the second antenna port to the second cyclic shift based on a determination that the remaining available cyclic shifts would accommodate the second delay spread for the second antenna port.

30. The apparatus of claim 25, further comprising:
means for receiving a delay spread feedback from the UE;
means for determining an updated first delay spread or the second delay spread based on the delay spread feedback; and
means for adjusting a number of data symbols that can be multiplexed based on the available cyclic shifts after the delay spread adjusting.

* * * * *